United States Patent [19]
Cox

[11] 3,856,500
[45] Dec. 24, 1974

[54] POTASSIUM POLYPHOSPHATE FERTILIZERS CONTAINING MICRONUTRIENTS

[75] Inventor: Donald E. Cox, Corpus Christi, Tex.

[73] Assignee: PPG Industries, Inc., Pittsburgh, Pa.

[22] Filed: Dec. 29, 1972

[21] Appl. No.: 319,137

Related U.S. Application Data

[63] Continuation-in-part of Ser. No. 811,569, March 28, 1969, abandoned.

[52] U.S. Cl............................. 71/34, 71/1, 71/64 SC
[51] Int. Cl.................................................. C05b 7/00
[58] Field of Search.......................... 71/1, 34, 64 C

[56] References Cited
UNITED STATES PATENTS

| | | | |
|---|---|---|---|
| 2,534,787 | 12/1950 | Mecca | 71/1 X |
| 2,859,104 | 11/1958 | Kroll | 71/1 |
| 2,988,439 | 6/1961 | Gloss | 71/1 |
| 3,022,154 | 2/1962 | Potts et al. | 71/34 |
| 3,131,048 | 4/1964 | Balassa | 71/1 |
| 3,244,500 | 5/1966 | Stimson | 71/34 X |
| 3,290,140 | 12/1966 | Young | 71/64 C X |
| 3,679,930 | 7/1972 | Young | 71/64 C X |

*Primary Examiner*—Frank A. Spear, Jr.
*Assistant Examiner*—Ferris H. Lander
*Attorney, Agent, or Firm*—Mark Levin

[57] ABSTRACT

Heavy metal potassium polyphosphates are described which are useful as fertilizers by supplying phosphate, potash, and micronutrient values to the soil. The heavy metal potassium polyphosphates may be in the form of finely-divided solids or in the form of a solution of dissolved heavy metal potassium polyphosphates. Exemplary heavy metal potassium polyphosphates are zinc potassium polyphosphates, iron potassium polyphosphates, and manganese potassium polyphosphates.

11 Claims, No Drawings

POTASSIUM POLYPHOSPHATE FERTILIZERS CONTAINING MICRONUTRIENTS

CROSS-REFERENCES TO RELATED APPLICATIONS

This application is a continuation-in-part of U.S. application Ser. No. 811,569, filed Mar. 28, 1969, now abandoned.

THE INVENTION

This invention relates to finely-divided, heavy metal potassium polyphosphates, to liquid fertilizers containing these finely-divided solids, and to liquid fertilizers containing dissolved heavy metal potassium polyphosphates.

Liquid fertilizers are currently enjoying a substantial increase in acceptance by farmers. A comparison of liquid fertilizers with solid fertilizers, such as powder or granules, reveals several factors favoring liquid fertilizers. Among these are ease of application, ease and accuracy of measuring solutions, ease of blending several different kinds of fertilizers to obtain a substantially homogenous material, and simplicity of the application, metering, and blending equipment required. It should be noted that the phrase "liquid fertilizer" as used herein includes those fertilizers which possess a liquid phase which may or may not contain finely-divided solids suspended therein. Those liquid fertilizers containing finely-divided, suspended solids may, for the purposes of handling and application, be treated in the same manner as pure liquids and hence the present usage of the phrase.

In spite of its many advantages, the role of the liquid fertilizer has been limited due to the problem of maintaining both a sufficiently high concentration of phosphate and a sufficiently great amount of usable heavy metal micronutrient to warrant a one-step application. Most micronutrients, such as compounds of zinc, for example, do not possess enough solubility in concentrated solutions of potassium orthophosphates to be of much commercial significance. Even when greater amounts of zinc are placed in solutions of potassium orthophosphates, precipitates form which clog the holding and application equipment.

It has now been found that substantial amounts of heavy metal micronutrients may be maintained in liquid fertilizers in the form of heavy metal potassium polyphosphates. The heavy metal potassium polyphosphates may be dissolved in the liquid phase and may or may not be present in the form of finely-divided solids dispersed or suspended in the liquid phase. Preferably, finely-divided heavy metal potassium polyphosphate solids are dispersed or suspended in the liquid phase.

As used herein, the phrase "finely divided" includes sizes in the colloidal range and sizes approaching the colloidal range. The particles of a suspension tend to settle upon standing whereas the particles of a colloidal dispersion show no tendency to settle and remain dispersed indefinitely upon standing. Colloidal particles may be distinguished from the solute of a true solution by the Tyndall effect: the colloidal particles scatter light whereas dissolved solutes do not. Since the change in properties of a dispersion with particle size is gradual rather than abrupt, it is impossible to draw sharp boundries between the size of colloidal particles and that of either suspended or dissolved particles. As a matter of convenience, however, colloidal particles are usually regarded as those having at least one dimension in the range of from 1 millimicron to 200 millimicrons.

The finely-divided particles of heavy metal potassium polyphosphates usually have at least one dimension in the range of from about 1 millimicron to about 10,000 millimicrons. Typically, the dimension is in the range of from about 1 millimicron to about 5,000 millimicrons. Preferably, the particles have at least one dimension in the range of from about 5 millimicrons to about 1,000 millimicrons. When the particles of heavy metal potassium polyphosphate are larger than colloidal particles, their size is such that significant settling does not occur for a period of at least one day and, preferably, for a period of at least a few days or even a few weeks. Generally speaking, such particles in the near-colloidal range will remain in suspension without purposeful mechanical agitation; only the rolling and jostling of the contents in the tank as it is transported to or over the field is required to maintain the particles in suspension.

While plants do not ordinarily assimilate micro-sized solids, they are often able to utilize finely-divided solid fertilizers.

The heavy metal potassium polyphosphate liquid fertilizers of the present invention contain at least about 0.1 percent by weight of the heavy metal. Generally, about 0.25 percent is preferred. By also including the finely-divided solids as taught herein, the liquid fertilizer solutions of the present invention may contain 30 percent by weight or more of the heavy metal. Of course, the maximum amount depends upon such factors as identities of the heavy metal potassium polyphosphates involved, relative proportions of the various heavy metal potassium polyphosphates when a mixture of heavy metal potassium polyphosphates is used, size distributions, and, in some cases, how the finely-divided solids were produced. Accordingly, the heavy metal content of the liquid fertilizers of the invention often fall in the range of from about 0.1 to about 30 percent by weight. Typically, the heavy metal content falls in the range of from about 0.25 to about 20 percent by weight.

The finely-divided solid heavy metal potassium polyphosphates of this invention usually contain at least about 5 percent heavy metal by weight. At least about 8 percent is preferred. The maximum amount depends upon such factors as identities of the heavy metal potassium polyphosphates involved and relative proportions of the various heavy metal potassium polyphosphates when a mixture of heavy metal potassium polyphosphates is used. Ordinarily, the heavy metal content of the finely-divided solid heavy metal potassium polyphosphates falls in the range of from about 5 to about 40 percent by weight. Usually the heavy metal content falls in the range of from about 8 to about 30 percent by weight.

Heavy metal potassium polyphosphate colloids and near-colloids may be prepared by reacting superphosphoric acid, a basic potassium compound such as potassium hydroxide, potassium carbonate, or potassium bicarbonate, and a reactable source of the desired micronutrient. The source may be a reactable compound of the micronutrient. Where the micronutrient in metallic form is reactive, such as is the case with zinc or iron, the metal may be used in lieu of or in addition to a reactable micronutrient compound.

The reaction of the ingredients may be accomplished in any of several ways. The reactable micronutrient source may be combined with the basic potassium compound and the resulting product combined with superphosphoric acid. The reactable micronutrient source may be combined with superphosphoric acid and the resulting product combined with the basic potassium compound. Another alternative is to combine the basic potassium compound with superphosphoric acid to partially neutralize the acid and then to combine the resulting potassium polyphosphate with the micronutrient source to further neutralize the acid or acidic salt. It is preferable in the above case to add the acid to the base rather than to add the base to the acid. Still another alternative is to simultaneously combine the superphosphoric acid, the basic potassium compound, and the reactable micronutrient source.

Another method by which the finely-divided heavy metal potassium polyphosphates may be produced is by partially neutralizing orthophosphoric acid and condensing the resulting orthophosphates. The orthophosphoric acid may be partially neutralized with a basic potassium compound such as potassium hydroxide, potassium carbonate, or potassium bicarbonate, after which the resulting potassium orthophosphates are partially condensed and then reacted with a reactable compound or metal of the desired micronutrient. Alternatively, the orthophosphoric acid may be partially neutralized with a reactable compound or metal of the desired micronutrient after which the resulting orthophosphates are partially condensed and then reacted with a basic potassium compound. In a further alternative, the orthophosphoric acid may be partially neutralized by the basic potassium compound and a reactable compound and/or metal of the desired micronutrient after which the resulting orthophosphates are partially or fully condensed.

The above procedures may also be used to prepare liquid fertilizers of this invention whether or not they contain finely-divided solid heavy metal potassium polyphosphates. Where clear solutions are desired, concentrations of the reagents and the resulting heavy metal potassium polyphosphates are such that the solubility limits of the materials are not exceeded.

The above procedures may be conducted batchwise, semi-batchwise, or continuously.

By maintaining as much micronutrient in solution as possible as well as by providing for the presence of the finely-divided solids, a liquid fertilizer can be prepared containing exceedingly large quantities of micronutrient. If desired, one or more additional chelating agents may be added before, during, or after the combination of any or all of the three major feed materials. This allows additional micronutrient to be chelated and, hence, kept in solution. Examples of suitable chelating agents are gluconic acid, citric acid, tartaric acid, succinic acid, and lactic acid, and their alkali metal salts, especially sodium and potassium salts of these acids. Potassium salts are preferred. Additional examples are polycarboxylic acid derivatives of amines or polyamines and the alkali metal salts of such derivatives, represented by ethylenediamine tetraacetic acid, potassium dihydroxyethyl glycinate, nitrilotriacetic acid, tripotassium nitrilotriacetate, trans-1,2-diaminocyclohexanetetraacetic acid, tripotassium hydroxyethylenediaminetriacetate, hydroxyethylethylenediamine triacetic acid, ethylenediamine di(ortho-hydroxyphenylacetic acid), diethylenetriaminepentaacetic acid, pentapotassium diethylenetriaminepentaacetate, diaminoethylether tetraacetic acid, and ethyleneglycol bis(aminoethyl ether) tetraacetic acid. While the potassium salts are preferred because of the potassium values which they provide to the soil upon eventual decomposition, the corresponding sodium salts may be used where economy is desired.

Various heavy metal micronutrients may be used in accordance with this invention, including zinc, copper, iron, manganese, and mixtures thereof. Examples of sources of these micronutrients include metallic zinc, zinc oxide, zinc chloride, potassium zincate, sodium zincate, zinc hydroxide, zincic acid, zinc sulfate, zinc sulfite, zinc sulfide, zinc oxysulfate, zinc ammonium sulfate, zinc potassium phosphate, zinc polyphosphate, zinc carbonate, zinc nitrate, zinc nitrite, manganese dithionate, manganese sulfate, manganese sulfite, manganese acetate, manganese chloride, manganese oxide, cupric oxide, cupric chloride, cupric sulfate, cupric nitrate, cupric carbonate, cupric acetate, cupric gluconate, cupric glycinate, cupric hydroxide, cupric borate, cupric nitrate, cupric ammonium sulfate, cuprous oxide, cuprous chloride, metallic iron, ferric sulfate, ferric ammonium citrate, ferric ammonium sulfate, ferric ammonium tartrate, ferric chloride, ferric citrate, ferric glycerophosphate, ferric nitrate, ferric hydroxide, ferric potassium phosphate, ferric potassium sulfate, ferric polyphosphate, ferric succinate, ferrous acetate, ferrous ammonium sulfate, ferrous chloride, ferrous gluconate, ferrous hydroxide, and ferrous oxide.

In the agricultural fertilizer art, it has become customary to report the nitrogen, phosphorus, and potassium content of the fertilizers as percent N, percent $P_2O_5$, and percent $K_2O$, these percentages being on a weight basis. It is not necessary that the phosphorus be present specifically in the form of phosphorus pentoxide, nor that the potassium be in the form of potassium oxide. An illustrative method for determining the $P_2O_5$ equivalent of fertilizer is as follows:

Orthophosphate can be determined in the presence of meta, pyro, and other polyphosphates by precipitation of ammonium phosphomolybdate at 10°C. using a solution formed by dissolving molybdic acid, nitric acid, ammonium hydroxide, and a small amount of $Na_2HPO_4$. The precipitate is filtered, dissolved in excess standard sodium hydroxide solution, and the excess base titrated with standard HCl. The orthophosphate is calculated and reported as ortho $P_2O_5$. Total phosphate is determined in the same manner, except that non-orthophosphate (including meta, pyro, and polyphosphates) is converted to the ortho form by boiling with $HNO_3$ prior to the precipitation and, further, the precipitation takes place at 35°C. instead of 10°C. Total phosphate is calculated and reported as total $P_2O_5$. The difference between total $P_2O_5$ and ortho $P_2O_5$ is taken as non-orthophosphate or, more simply, as non-ortho $P_2O_5$.

Because sequestration and supersaturation of the micronutrient appears to be accomplished to a greater degree by the polyphosphate rather than by the orthophosphate, it is preferred that the amount of non-orthophosphate be as high as possible. When superphosphoric acid is reacted with potassium hydroxide, potassium bicarbonate, or potassium carbonate, both orthophosphate and non-orthophosphate are produced. It has been found that the formation of non-orthophosphate during the reaction is favored by low temperatures, low levels of impurities, and low hydrolysis. Hydrolysis is a function of the amount of water present, the pH, the temperature, and the time the non-orthophosphate is exposed to the water, temperature, and pH.

The temperature of the neutralization reaction (i.e., the reaction which produces water of reaction) should be held as low as is reasonably possible while maintaining an acceptable rate of reaction. Temperatures generally range from about 30° to about 90°C. Ordinarily, temperatures in the range of from about 45° to about 65°C. are used. It is preferred that the temperature be held at least as low as 60°C.

The potassium hydroxide, potassium carbonate, or potassium bicarbonate may be added in the form of a concentrated aqueous solution. The presence of a small amount of water has been beneficial in that it allows the reaction between the basic potassium compound and the superphosphoric acid to proceed at a faster rate than when it is entirely absent. It is preferred that as little water as is conveniently possible be used, however, so that hydrolysis of the non-orthophosphates or superphosphoric acid will be held to a low level.

Potassium hydroxide solutions which are combined with super-phosphoric acid ordinarily contain at least about 30 percent by weight potassium hydroxide. More often, they contain 40, 45, 50, 60, or 67 percent or more. Similarly, potassium carbonate solutions which are similarly used generally contain at least about 30 percent by weight potassium carbonate. Greater concentrations, such as 40, 50, or 60 percent or more, are often the rule. Potassium bicarbonate solutions containing at least about 30 percent by weight potassium bicarbonate are also suitable. Clearly, solutions or mixtures of potassium hydroxide, potassium carbonate, and potassium bicarbonate may be used, if desired. In such cases, the solution generally contains at least about 30 percent solute by weight. More concentrated solutions are preferred. Irrespective of which salt is used or whether a mixture of them is employed, the solution may be saturated with solute. An advantage of using potassium carbonate in place of all or a portion of the potassium hydroxide is that less water is produced by the reaction.

Solid particles of potassium hydroxide, potassium carbonate, potassium bicarbonate, or mixtures thereof may be combined with the superphosphoric acid. These particles may be dispersed in a solution, usually saturated with respect to the salts contained making up the particles. The solution and dispersed particles may be added to the superphosphoric acid. Alternatively, the particles may be added directly to the superphosphoric acid. Water may be introduced concurrently with or after the potassium compound and superphosphoric acid have been combined. If water is combined with the superphosphoric acid prior to combining the acid solution with the potassium compound, it is preferred that the time interval between these two combinations be kept small to reduce hydrolysis.

For the same reason of minimizing hydrolysis, it is preferred that water of reaction be removed as it is formed. While the reaction may be conducted at atmospheric pressure or above, it is advantageous to use reduced pressure to aid in the removal of water. If desired, however, the reaction may be conducted without removing significant amounts of water while conducting the reaction. In this case, water may be removed after completing the reaction. While not being desirable, it is permissible to omit water removal. The longer the potassium polyphosphates are allowed to remain in contact with the large quantities of water, the more hydrolysis to the orthophosphate form will occur. Thus, when water is to be removed from the completed reaction mixture, it is preferred that the rate of evaporation be accelerated by the use of reduced pressure. Brief exposure to elevated temperatures for removal of water, however, does not unduly hydrolyze the polyphosphates.

The term "superphosphoric acid" used in this specification and claims is defined as a phosphoric acid containing substantial quantities of both ortho and polyphosphoric acids. These polyphosphoric acids include pyrophosphoric acid and other polymers from the tri- to the nona- polymer and higher. The proportions of the polyphosphoric acids vary with the total $P_2O_5$ content of the superphosphoric acid. For descriptions of these acids see Huhti and Gartaganis, "The Composition of the Strong Phosphoric acids," Canadian Journal of Chemistry, Vol. 34, pages 785–797 (1956), and Striplin, Stinson, and Potts, U.S. Pat. No. 2,950,961. The superphosphoric acid should be as high as practicable in non-orthophosphate. It is preferably produced by dissolving $P_2O_5$ in water or orthophosphoric acid. Superphosphoric acid may also be prepared by evaporating water from furnace acid (orthophosphoric acid prepared by dissolving $P_2O_5$ in water) or wet acid (orthophosphoric acid prepared by acidulating phosphate rock with a strong acid such as sulfuric acid). Because the presence of impurities usually found in wet acid tends to reduce the solubility of potassium polyphosphates, it is customary to use superphosphoric acid prepared by dissolving $P_2O_5$ or by the concentration of furnace acid. Since the effect of various impurities cannot usually be predicted in advance, empirical methods are employed to ascertain this information.

The pH of the final product will depend to a large extent upon the amount of hydrolysis that can be tolerated. The rate of hydrolysis appears to be favored by acidic values of pH and perhaps by very high values of pH. It is preferred that the pH lie in the range of from about 6 to about 11; preferably the pH lies in the range of from about 6.8 to about 10.5. If the liquid fertilizer of this invention is to be mixed with ammonium compounds, the pH ordinarily lies in the range of from about 6.0 to about 7.5 in order to minimize nitrogen loss through evolution of ammonia gas; preferably the pH lies in the range of from about 6.2 to about 7.2. Should any pH adjustment be necessary, it may conveniently be accomplished with any of the standard acids, e.g., hydrochloric, sulfuric, phosphoric, pyrophosphoric, superphosphoric, carbonic, or acetic, or with any of the standard bases, e.g., sodium hydroxide, potassium hydroxide, sodium carbonate, potassium carbonate, sodium bicarbonate, or potassium bicarbonate.

In order to sequester large amounts of micronutrient, it is preferred that at least about 35 percent by weight of the reported total $P_2O_5$ of the fertilizer solutions be reported as non-ortho $P_2O_5$ while the lesser amounts, e.g., as low as about 15 percent, may be used if desired. Usually the percent non-ortho $P_2O_5$ is higher, e.g., 50, 55, 60, 65 percent or more, of the total $P_2O_5$.

The fertilizer solutions of this invention may be applied to the soil by any of the methods commonly employed to apply fertilizer solutions. Among the most useful are spraying and injection. Often, tool bar applicators are used. Fertilizer may be applied before planting seed or crop plants, during the planting of seed or crop plants, after the planting of crop plants, after the planting of seed but preemergence the crop plant, and after emergence of the crop plant. The amount of fertilizer applied will depend upon the results desired, the crop involved, and the economic situation at the time. The amount of total $P_2O_5$ and $K_2O$ applied may be as high as 200 pounds per acre or even higher. Of course, the polyphosphate fertilizer of the present invention may be blended with other nutrient materials prior to application.

When hydrolysis is a factor of minor consideration, diluted liquid fertilizers of potassium polyphosphate-containing micronutrients may be applied to the soil by any of the above methods and also by adding the liquid fertilizer to irrigation water. Dilute liquid fertilizer may also be applied to the foliage of plants for foliar absorption. Often the diluted liquid fertilizer also contains nitrogen compounds such as ammonium phosphate, ammonium thiosulfate, and/or urea. Potassium chloride may be added to dilute liquid fertilizers since to is no longer a problem. Other potassium salts may be added in lieu of potassium chloride, especially when application is to chloride ion-sensitive crops.

EXAMPLE I

Twenty-five grams of zinc oxide and 5 grams of 50 percent aqueous gluconic acid solution were added to 160 milliliters of 50 percent aqueous potassium hydroxide solution (specific gravity 1.52). This was placed in a 1-liter, 3-necked flask equipped with an agitator. Seventy-nine milliliters of a mixture of wet superphosphoric acid and furnace superphosphoric acid (specific gravity 2.00, 75.6 percent by weight total $P_2O_5$) were added from a graduated cylinder through a stopcock over a period of about 45 minutes. The temperature of the reaction varied between 45° and 65°C. The vacuum varied between about 710 and about 730 millimeters of mercury. Upon completion of the reaction, 355 grams of product were made. This was split into equal portions. Eighteen grams of water wee added to one portion and 18 grams of a solution of ammonium polyphosphate (11-37-0 solution) were added to the other. The final pH was 7.4. Analysis of the portion containing the ammonium polyphosphate solution showed that it contained 32.2 percent total $P_2O_5$, 6.90 percent ortho $P_2O_5$, 25.6 percent $K_2O$, 1.24 percent $NH_3$, and 5.02 percent Zn, all percentages being by weight. The product contained a finely-divided zinc potassium polyphosphate.

EXAMPLE II

Twenty grams of powdered zinc metal were slowly added to 79 milliliters of a mixture of wet superphosphoric acid and furnace superphosphoric acid (specific gravity 2.00, 75.6 percent by weight total $P_2O_5$). After reaction of the zinc with the acid, 5 grams of 50 percent gluconic acid solution and 160 milliliters of 50 percent aqueous potassium hydroxide solution (specific gravity 1.52) were placed in a reactor flask equipped with an agitator. The zinc-acid reaction product was placed in a graduated cylinder and slowly added through a stopcock to the agitated reactor flask. The temperature during this addition varied between 59° and 80°C. The vacuum varied between about 680 and 730 millimeters of mercury. Upon completion of the reaction, 369 grams of product were made. A finely-divided zinc potassium polyphosphate was dispersed or suspended throughout the solution. A few unreacted particles of zinc metal could be seen in the product. Half the product was mixed with 18 grams of water and the other half was mixed with 18 grams of a solution of ammonium polyphosphate (11-37-0 solution). The final pH was 7.6. Analysis of the water-diluted product showed 25.7 percent total $P_2O_5$, 8.17 percent ortho $P_2O_5$, 24.5 percent $K_2O$, and 4.42 percent Zn. Analysis of the mixture of product and ammonium polyphosphate solution showed 29.1 percent total $P_2O_5$, 7.94 percent ortho $P_2O_5$, 24.1 percent $K_2O$, and 1.24 percent $NH_3$. All percentages are percent by weight.

EXAMPLE III

Thirty grams of zinc oxide and 8 milliliters of 50 percent gluconic acid solution were added to 233 milliliters of 50 percent aqueous potassium hydroxide solution and placed in a reactor flask equipped with an agitator. One hundred milliliters of furnace superphosphoric acid containing 77.2 percent by weight total $P_2O_5$ were added slowly from a graduated cylinder through a stopcock. The temperature of the reaction varied between 50° and 80°C. The vacuum varied between about 665 and 720 millimeters of mercury. The product contained a finely-divided zinc potassium polyphosphate. To a 104.5 gram portion of the product were added 27.7 grams of a solution of ammonium polyphospate (11-37-0 solution). Analysis of the mixture showed 31.9 percent total $P_2O_5$, 12.1 percent ortho $P_2O_5$, 23.2 percent $K_2O$, 1.2 percent $NH_3$, and 3.83 percent Zn, all percentages being percent by weight.

EXAMPLE IV

Twenty-five grams of powdered zinc metal were added to 100 milliliters of furnace superphosphoric acid containing 77.2 percent by weight total $P_2O_5$. The mixture was allowed to react for 48 hours with occasional manual stirring. A white paste was formed. Two hundred seventy milliliters of 50 percent aqueous potassium hydroxide solution were measured out. A small part of this was added to the white paste in an open beaker and manually stirred to form a viscous but pourable liquid. This liquid was transferred to a reactor flask equipped with an agitator and the balance of the potassium hydroxide solution was added through a stopcock from a graduated cylinder. During the addition of the potassium hydroxide solution, the temperature varied between 40° and 61°C. and the vacuum ranged from about 700 to about 730 millimeters of mercury. After the potassium hydroxide solution had been added, the product was left under vacuum in the reactor for 30 minutes to remove more of the water by evaporation. The product contained a finely-divided zinc potassium polyphosphate. The final pH of the product was 7.9. Analysis of the product showed it to contain 23.9 percent total $P_2O_5$, 17.5 percent ortho $P_2O_5$, 25.1 percent $K_2O$, and 4.73 percent Zn, all percentages being percent by weight.

EXAMPLE V

Sixty grams of zinc oxide were added to 280 milliliters of a 50 percent aqueous solution of potassium hydroxide and the mixture placed in a reaction vessel equipped with an agitator. One hundred forty milliliters of furnace superphosphoric acid containing 77.2 percent by weight total $P_2O_5$ were introduced from a graduated cylinder to the reaction vessel through a stopcock. The temperature of the reaction varied from 30° to 85°C. and the vacuum varied from about 680 to about 720 millimeters of mercury. The product contained a finely-divided zinc potassium polyphosphate. The final pH of the product was 7.7. Analysis of the product showed it to contain 6.1 percent by weight Zn.

EXAMPLE VI

Ninety grams of zinc oxide were added to 280 milliliters of a 50 percent by weight aqueous solution of potassium hydroxide and the mixture placed in a reaction vessel equipped with an agitator. One hundred forty milliliters of furnace superphosphoric acid containing 77.2 percent by weight total $P_2O_5$ were introduced to the reaction vessel from a graduated cylinder through a stopcock. The temperature of the reaction varied from 30° to 77°C. and the vacuum ranged from about 690 to about 720 millimeters of mercury. The product contained a finely-divided zinc potassium polyphosphate. The final pH of the product was 7.2. Analysis of the product showed it to contain 9.0 percent by weight Zn.

EXAMPLE VII

One hundred eighty grams of zinc oxide were added to 280 milliliters of a 50 percent by weight aqueous solution of potassium hydroxide and the mixture placed in a reaction vessel equipped with an agitator. One hundred forty milliliters of furnace superphosphoric acid containing 77.2 percent by weight total $P_2O_5$ were introduced to the reaction vessel from a graduated cylinder through a stopcock. The temperature of the reaction varied from 30° to 90°C. and the vacuum ranged from about 670 to about 720 millimeters of mercury. The product was a stable thick dispersion or suspension of a finely-divided zinc potassium polyphosphate. Analysis showed the product to contain 16.4 percent by weight Zn.

EXAMPLE VIII

One hundred eighty grams of zinc oxide were added to 300 milliliters of a 50 percent by weight aqueous solution of potassium hydroxide and the mixture placed in a reaction vessel equipped with an agitator. One hundred fifty milliliters of furnace superphosphoric acid containing 77.2 percent by weight total $P_2O_5$ were introduced to the reaction vessel from a graduated cylinder through a stopcock. The temperature of the reaction varied from 30° to 80°C. and the vacuum ranged from about 500 to about 620 millimeters of mercury. The product was a stable thick dispersion or suspension of a finely-divided zinc potassium polyphosphate. Analysis showed the product to contain 16.6 percent by weight Zn. The product was thixotropic and had a pH of 10. After standing for about 2 months, the product turned very fluid.

EXAMPLE IX

Thirty grams of zinc oxide were added to 300 milliliters of a 50 percent by weight aqueous solution of potassium hydroxide and the mixture placed in a reaction vessel equipped with an agitator. One hundred fifty milliliters of furnace superphosphoric acid containing 77.2 percent by weight total $P_2O_5$ were introduced to the reaction vessel from a graduated cylinder through a stopcock. The temperature of the reaction varied from 30° to 70°C. and the vacuum ranged from about 600 to about 710 millimeters of mercury. The product contained a finely-divided zinc potassium polyphosphate. Analysis showed the product to contain 4.9 percent by weight Zn.

EXAMPLE X

Five hundred forty grams of zinc oxide were added to 900 milliliters of a 50 percent by weight aqueous solution of potassium hydroxide and the mixture was placed in a reaction vessel equipped with an agitator. Five hundred milliliters of furnace superphosphoric acid containing 77.2 percent by weight total $P_2O_5$ were introduced to the reaction vessel. The temperature of the reaction varied from about 30° to about 80°C. and the vacuum ranged from about 600 to about 710 millimeters of mercury. The product was moderately thixotropic. Analysis showed the product to contain 30.4 percent total $P_2O_5$, 21.8 percent $K_2O$, and 16.7 percent Zn, all percentages being percent by weight.

EXAMPLE XI

Seven thousand eight hundred grams of a 50 percent by weight aqueous solution of potassium hydroxide were charged into a 2½ gallon reactor equipped with a mechanical agitator. Zinc oxide in the amount of 3,250 grams were added. A vacuum was applied and 5,200 grams of furnace grade superphosphoric acid having a total $P_2O_5$ content of 79 percent were added over a period of three hours. During the addition of acid, the temperature was maintained in a range of from 24° to 55°C. and the vacuum ranged from 23.5 to 26.3 inches of mercury. The product weighed 29 pounds and was moderately thixotropic. The product contained a finely-divided zinc potassium polyphosphate. Analysis showed the product to contain 28.4 percent total $P_2O_5$, 11.7 percent ortho $P_2O_5$, 22.0 percent $K_2O$, and 16.9 percent Zn, all percentages being percent by weight.

EXAMPLE XII

Fifteen grams of metallic iron were reacted with 100 milliliters of furnace superphosphoric acid containing 77.2 percent by weight total $P_2O_5$. This mixture was placed in a reaction vessel equipped with an agitator and 300 milliliters of 50 percent aqueous solution of potassium hydroxide were thereafter added from a graduated cylinder through a stopcock. The temperature during the potassium hydroxide addition varied from 30° to about 95°C. and the vacuum varied from about 600 to about 710 millimeters of mercury. The product contained a finely-divided iron potassium polyphosphate. Analysis showed the product to contain 24.0 percent total $P_2O_5$, 15.7 percent ortho $P_2O_5$, 28.2 percent $K_2O$, and 2.0 percent Fe, all percentages being percent by weight.

EXAMPLE XIII

Forty grams of metallic iron were reacted with 100 milliliters of furnace superphosphoric acid containing 77.2 percent by weight total $P_2O_5$. This mixture was placed in a reaction vessel equipped with an agitator and 300 milliliters of 50 percent aqueous solution of potassium hydroxide were thereafter added from a graduated cylinder through a stopcock. The temperature during the potassium hydroxide addition varied from 30° to 80°C. The reaction was conducted under a vacuum of the same order as Examples I to XI. The product was a stable thick dispersion or suspension of finely-divided iron potassium polyphosphate. Analysis showed the product to contain 4.9 percent by weight Fe.

EXAMPLE XIV

Five grams of ferric oxide were added to 300 milliliters of a 50 percent by weight aqueous solution of potassium hydroxide and the mixture placed in a reaction vessel equipped with an agitator. One hundred milliliters of furnace superphosphoric acid containing 77.2 percent by weight total $P_2O_5$ were introduced to the reaction vessel from a graduated cylinder through a stopcock. The temperature of the reaction varied from 30° to 70°C. and the vacuum ranged from about 580 to about 630 millimeters of mercury. The product contained a finely-divided iron potassium polyphosphate. The final pH was 7.0. Analysis showed the product to contain 0.1 percent by weight Fe.

EXAMPLE XV

Thirty grams of ferrous sulfate were added to 300 milliliters of a 50 percent by weight aqueous solution of potassium hydroxide and the mixture placed in a reaction vessel equipped with an agitator. One hundred milliliters of furnace superphosphoric acid containing 77.2 percent by weight total $P_2O_5$ were introduced to the reaction vessel from a graduated cylinder through a stopcock. The temperature of the reaction and the vacuum were about the same as Example XIV. The product contained a finely-divided iron potassium polyphosphate. Analysis showed the product to contain 1.5 percent by weight Fe.

EXAMPLE XVI

Fifty grams of manganous acetate tetrahydrate were reacted with 300 milliliters of 50 percent aqueous potassium hydroxide solution and placed in a reaction vessel equipped with an agitator. One hundred milliliters of furnace superphosphoric acid containing 77.2 percent by weight total $P_2O_5$ were thereafter added from a graduated cylinder through a stopcock. The temperature during the acid addition varied from 30° to 70°C. and the vacuum varied from about 610 to about 710 millimeters of mercury. The product was a stable purplish colored dispersion or suspension of finely-divided manganese potassium polyphosphate particles. Analysis showed the product to contain 28.7 percent total $P_2O_5$, 25.4 percent $K_2O$, and 1.8 percent Mn, all percentages being percent by weight.

EXAMPLE XVII

Forty-five grams of manganous chloride were placed in a reaction vessel equipped with an agitator and a vacuum was applied. Three hundred milliliters of 50 percent aqueous potassium hydroxide solution were then added. Thereafter 140 milliliters of furnace superphosphoric acid containing 77.2 percent by weight total $P_2O_5$ were added. During the reaction the temperature varied from 30° to 72°C. and the vacuum varied from about 695 to about 725 millimeters of mercury. The product was a suspension of finely-divided manganese potassium polyphosphate which settled out upon standing. Analysis showed the product to contain 2.6 percent by weight Mn.

EXAMPLE XVIII

One hundred three grams of manganous acetate tetrahydrate were placed in a reaction vessel equipped with an agitator and a vacuum was applied. Three hundred milliliters of 50 percent aqueous potassium hydroxide solution were added. One hundred milliliters of furnace superphosphoric acid containing 77.2 percent by weight total $P_2O_5$ were thereafter slowly added. During the acid addition the temperature varied from 30° to 78°C. and the vacuum varied from about 700 to about 720 millimeters of mercury. The product was a suspension of finely-divided manganese potassium polyphosphate which settled out upon standing. Analysis showed the product to contain 3.1 percent by weight Mn.

EXAMPLE XIX

Eighty grams of manganous chloride were placed in a reaction vessel equipped with an agitator and a vacuum was applied. Three hundred milliliters of a 50 percent aqueous potassium hydroxide solution were added. Thereafter 100 milliliters of furnace superphosphoric acid containing 77.2 percent by weight total $P_2O_5$ were added. During the reaction the temperature varied from 30° to 70°C. and the vacuum varied from about 600 to about 710 millimeters of mercury. The product was a suspension of finely-divided manganese potassium polyphosphate which settled out upon standing. Analysis showed the product to contain 4.5 percent by weight Mn.

EXAMPLE XX

In a dry box having a nitrogen atmosphere 5 grams of manganous oxide were placed in 300 milliliters of a 50 percent aqueous potassium hydroxide solution. The combined materials were then placed in a reaction vessel equipped with an agitator and a vacuum was applied. One hundred milliliters of furnace superphosphoric acid containing 77.2 percent by weight total $P_2O_5$ were added. During the reaction the temperature varied from 30° to 64°C. and the vacuum varied from about 700 to about 710 millimeters of mercury. The product was a stable purple solution containing no particulate matter. Analysis showed the product to contain 0.5 percent by weight Mn. After standing about 6 weeks, a precipitate was found on the bottom of the container. Analysis showed the product to contain 0.05 percent by weight Mn.

EXAMPLE XXI

In a dry box having a nitrogen atmosphere 43 grams of manganous oxide were placed in 300 milliliters of a 50 percent aqueous potassium hydroxide solution. The combined materials were then placed in a reaction vessel equipped with an agitator and a vacuum was applied. One hundred milliliters of furnace superphosphoric acid containing 77.2 percent by weight total $P_2O_5$ were added. During the reaction the temperature varied from 30° to 75°C. and the vacuum varied from about 680 to about 710 millimeters of mercury. The product was a suspension containing unreacted manganous oxide or manganese dioxide and was purple in color. Analysis showed the product to contain 4.3 percent by weight Mn.

EXAMPLE XXII

Five grams of manganese dioxide were placed in a reaction vessel equipped with an agitator and a vacuum was applied. Three hundred milliliters of 50 percent aqueous potassium hydroxide solution were added. Thereafter 100 milliliters of furnace superphosphoric acid containing 77.2 percent by weight total $P_2O_5$ were added. During the reaction the temperature varied from 30° to 70°C. The reaction was conducted under a vacuum of the same order as Examples XVI to XXI. About 3 grams of the manganese dioxide remained unreacted. The product was a solution in which finely-divided manganese potassium polyphosphate slowly formed and precipitated. Analysis showed the product to contain 0.4 percent by weight Mn.

EXAMPLE XXIII

In a dry box having a nitrogen atmosphere 20 grams of manganous oxide were placed in 300 milliliters of 50 percent aqueous potassium hydroxide solution. The combined materials were then placed in a reaction vessel equipped with an agitator and a vacuum was applied. One hundred milliliters of furnace superphosphoric acid containing 77.2 percent by weight $P_2O_5$ were added. During the reaction the temperature varied from 30° to 75°C. The reaction was conducted under a vacuum of the same order of magnitude as Examples XVI to XXI. Not all of the manganous oxide was reacted. The product was a thick suspension of finely-divided manganese potassium polyphosphate in which several large crystals formed. Analysis showed the product to contain 2.0 percent by weight Mn.

EXAMPLE XXIV

Two grams of manganous oxide were placed in a reaction vessel equipped with an agitator and a vacuum was applied. One hundred milliliters of furnace superphosphoric acid containing 77.2 percent by weight $P_2O_5$ were added. Thereafter 300 milliliters of 50 percent aqueous potassium hydroxide solution were added. During the reaction the temperature varied from 30° to 90°C. The reaction was conducted under a vacuum of the same order as Examples XVI to XXI. In addition to finely-divided solids, the product contained several large pieces of solids. Analysis showed the product to contain 0.2 percent by weight Mn.

EXAMPLE XXV

Seventeen grams of manganous oxide were placed in a reaction vessel equipped with an agitator and a vacuum was applied. One hundred milliliters of furnace superphosphoric acid containing 77.2 percent by weight $P_2O_5$ were added. Thereafter 300 milliliters of 50 percent aqueous potassium hydroxide solution were added. During the reaction the temperature varied from 30° to 80°C. The reaction was conducted under a vacuum of the same order as Examples XVI to XXI. The product was a suspension of finely-divided manganese potassium polyphosphate. Analysis showed the product to contain 1.8 percent by weight Mn. Upon standing for 48 hours the finely-divided solids settled out, leaving a clear liquor above the solids.

EXAMPLE XXVI

Fourteen grams of manganous oxide were placed in a reaction vessel equipped with an agitator and a vacuum was applied. One hundred milliliters of furnace superphosphoric acid containing 77.2 percent by weight $P_2O_5$ were added. Thereafter 300 milliliters of 50 percent aqueous potassium hydroxide solution were added. The reaction was conducted under conditions of temperature and vacuum of the same order as those in Examples XVI to XXI. The product was a suspension of finely-divided manganese potassium polyphosphate which settled upon standing. Analysis showed the product to contain 1.5 percent by weight Mn.

EXAMPLE XXVII

In a dry box having a nitrogen atmosphere 2 grams of manganous oxide were placed in 300 milliliters of 50 percent aqueous potassium hydroxide solution. The combined materials were then placed in a reaction vessel equipped with an agitator and a vacuum was applied. one hundred milliliters of furnace superphosphoric acid containing 77.2 percent by weight total $P_2O_5$ were added. During the reaction the temperature varied from 30° to 70°C. The reaction was conducted under a vacuum of the same order as Examples XVI to XXI. The product was a stable purple solution containing no particulate matter. After standing about 6 weeks, a precipitate was found on the bottom of the container. Analysis showed the product to contain 0.05 percent by weight Mn.

EXAMPLE XXVIII

One hundred fourteen grams of manganous acetate tetrahydrate were placed in a reaction vessel equipped with an agitator and a vacuum was applied. Three hundred milliliters of 50 percent aqueous potassium hydroxide solution were added. One hundred milliliters of furnace superphosphoric acid containing 77.2 percent by weight total $P_2O_5$ were thereafter slowly added. The reaction was conducted under a vacuum and at temperatures of the same order as Examples XVI and XVIII. The product contained finely-divided manganese potassium polyphosphate. Analysis showed the product to contain 3.3 percent by weight Mn.

I claim:

1. A liquid fertilizer composition having suspended or dispersed in its liquid phase as a micronutrient source finely-divided heavy metal potassium polyphosphate solid particles, at least one dimension of said particles being in the range of from about 1 millimicron to about 10,000 millimicrons, the heavy metal content of said composition being from 0.1 to 30 percent by weight and the heavy metal content of said polyphosphate being from 5 to 40 percent by weight.

2. The liquid fertilizer of claim 1 wherein the heavy metal is selected from the group consisting of zinc, copper, iron, manganese, and mixtures thereof.

3. The liquid fertilizer of claim 1 wherein the heavy metal is zinc.

4. The liquid fertilizer of claim 1 which contains at least one chelating agent.

5. The liquid fertilizer of claim 4 wherein the chelating agent is selected from the group consisting of gluconic acid, citric acid, tartaric acid, succinic acid, lactic acid, and alkali metal salts of such acids.

6. The liquid fertilizer of claim 5 wherein the alkali metal of the alkali metal salts is potassium.

7. The liquid fertilizer of claim 4 wherein the chelating agent is a polycarboxylic acid derivative of an amine or polyamine or a sodium or potassium salt of such polycarboxylic acid derivative.

8. A method comprising applying to soil a fertilizing amount of a liquid fertilizer composition that contains dispersed or suspended in its liquid phase a micronutrient source finely-divided heavy metal potassium polyphosphate solid particles, at least one dimension of said solid particles being in the range of from about 1 millimicron to about 10,000 millimicrons, the heavy metal content of said composition being from 0.1 to 30 percent by weight and the heavy metal content of said polyphosphate being from 5 to 40 percent by weight.

9. The method of claim 8 wherein the heavy metal is selected from the group consisting of zinc, copper, iron, manganese, and mixtures thereof.

10. The method of claim 8 wherein the heavy metal is zinc.

11. The method of claim 8 where said liquid fertilizer composition is mixed with a substance selected from the group consisting of other compatible liquid fertilizers and water prior to being applied to the soil.

* * * * *